US009335199B2

(12) United States Patent
Hodgson et al.

(10) Patent No.: US 9,335,199 B2
(45) Date of Patent: May 10, 2016

(54) DEVICE FOR STORAGE OF AN OPERATING FLUID FOR A MOTOR VEHICLE, METHOD FOR MOUNTING THE DEVICE, METHOD FOR MONITORING THE DEVICE AND MOTOR VEHICLE

(71) Applicant: Emitec Gesellschaft fuer Emissionstechnologie mbH, Lohmar (DE)

(72) Inventors: Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 499 days.

(21) Appl. No.: 13/652,930

(22) Filed: Oct. 16, 2012

(65) Prior Publication Data
US 2013/0036726 A1 Feb. 14, 2013

Related U.S. Application Data

(63) Continuation of application No. PCT/EP2011/054314, filed on Mar. 22, 2011.

(30) Foreign Application Priority Data

Apr. 16, 2010 (DE) .......................... 10 2010 015 154

(51) Int. Cl.
*F01N 3/00* (2006.01)
*G01F 23/24* (2006.01)
*G01F 23/26* (2006.01)

(52) U.S. Cl.
CPC ............ *G01F 23/242* (2013.01); *G01F 23/265* (2013.01); *G01F 23/268* (2013.01); *Y10T 29/49826* (2015.01)

(58) Field of Classification Search
CPC .... G01F 23/242; G01F 23/268; G01F 23/265
USPC ................................................. 60/295, 317
See application file for complete search history.

(56) References Cited

U.S. PATENT DOCUMENTS 8,237,454 B2    8/2012  Slezak et al.
2007/0113625 A1*  5/2007  Sasanuma et al. ........... 73/61.46
(Continued)

FOREIGN PATENT DOCUMENTS

DE    198 41 770 A1    4/2000
DE    100 27 183 A1    12/2001
(Continued)

OTHER PUBLICATIONS

English translation of German Patent Application Publication No. DE 19841770 A1 (Apr. 2000).*
(Continued)

*Primary Examiner* — Jason Shanske
(74) *Attorney, Agent, or Firm* — Laurence A. Greenberg; Werner H. Stemer; Ralph H. Locher

(57) ABSTRACT

A device for storing or supplying an operating fluid includes a tank with an interior space and a protrusion which protrudes into the interior space and has a circumferential surface. At least one electrode for determining a filling level is disposed radially, running around the circumferential surface. Methods for mounting such a device and for monitoring a reserve filling level as well as a motor vehicle are also provided.

12 Claims, 2 Drawing Sheets

(56) References Cited

U.S. PATENT DOCUMENTS

| | | |
|---|---|---|
| 2007/0193345 A1* | 8/2007 | Yamamoto et al. .......... 73/61.41 |
| 2009/0153150 A1 | 6/2009 | Slezak et al. |
| 2009/0173152 A1* | 7/2009 | Sato et al. .................. 73/304 C |
| 2012/0111870 A1 | 5/2012 | Hodgson et al. |

FOREIGN PATENT DOCUMENTS

| | | |
|---|---|---|
| EP | 2 071 301 A1 | 6/2009 |
| JP | 272936 U | 6/1990 |
| JP | 5124217 A | 5/1993 |
| JP | 2000111389 A | 4/2000 |
| JP | 2004510151 A | 4/2004 |
| JP | 2007253867 A | 10/2007 |
| JP | 2008014866 A | 1/2008 |
| WO | 02/27280 A2 | 4/2002 |
| WO | 2010149573 A1 | 12/2010 |

OTHER PUBLICATIONS

English translation of PCT Patent Application Publication No. WO 0227280 A1 (Apr. 2002).*
International Search Report of PCT/EP2011/054314.

* cited by examiner

DEVICE FOR STORAGE OF AN OPERATING FLUID FOR A MOTOR VEHICLE, METHOD FOR MOUNTING THE DEVICE, METHOD FOR MONITORING THE DEVICE AND MOTOR VEHICLE

CROSS-REFERENCE TO RELATED APPLICATION

This application is a continuation, under 35 U.S.C. §120, of copending International Application No. PCT/EP2011/054314, filed Mar. 22, 2011, which designated the United States; this application also claims the priority, under 35 U.S.C. §119, of German Patent Application DE 10 2010 015 154.8, filed Apr. 16, 2010; the prior applications are herewith incorporated by reference in their entirety.

BACKGROUND OF THE INVENTION

Field of the Invention

The invention relates to a device for storage or supply of an operating fluid which is used, in particular, in a motor vehicle and includes an electrode configuration for determining a filling level. The invention also relates to a method for mounting the device, a method for monitoring the device and a motor vehicle.

Devices for storing and supplying operating fluids have always been necessary in motor vehicles. For example, in order to operate motor vehicles, at least one fuel, windshield washing fluid, etc. must be carried in tanks or similar containers. Not the least of all, motor vehicles are increasingly being fitted with an exhaust system to clean the exhaust emissions from an internal combustion engine, in which case an additional operating medium (in particular an oxidation agent and/or a reducing agent in liquid form) is supplied to the exhaust system and must also be stored and carried. That guarantees particularly effective exhaust gas cleaning.

One example of an exhaust gas cleaning process for which such an operating fluid is required is selective catalytic reduction (SCR). In that process, a reducing agent (e.g. ammonia) and/or a reducing agent precursor (e.g. urea) is introduced into the exhaust system. A known reducing agent precursor solution is a 32.5% urea-water solution which is also available commercially under the trademark AdBlue. The reducing agent precursor is converted into ammonia, the actual reducing agent, in the exhaust gas or externally to the exhaust gas. Nitrogen oxide compounds in the exhaust gas are effectively reduced by the ammonia which is thus produced.

It is usually necessary to economically, easily and reliably determine the filling level of the operating fluid in the respective tank of the motor vehicle. Electrodes are suitable for determining the filling level of operating fluids which are electrically conductive or which have other significant electrical properties. With such electrodes, for example, it is possible to carry out monitoring between two adjacent electrodes as to whether or not certain electrical properties such as resistance, capacitance and/or inductance change. Depending on such a measurement it can be established whether or not operating fluid is present in the vicinity of the electrodes.

Frequently, different tanks are used to store operating fluids for different motor vehicle types. That depends firstly on the size of the motor vehicle and secondly on the space available for a device for providing reducing agent. In addition, the structure of the tank is also dependent on the consumption of the motor vehicle and/or the safety regulations and/or production restrictions, etc. Within the context of motor vehicle construction, normally as many identical parts as possible are used for different vehicle types. That allows the manufacturer of the motor vehicle to make substantial cost savings. Consequently, a device for determining the filling level in a tank must also be constructed in such a way that it can be used or adapted for different tank geometries.

It can also be sensible to use differently set devices for determining the filling level in two identical tanks for different applications or different motor vehicles. Determining the filling level is particularly important in establishing when a reserve volume of operating fluid has been reached or passed. When a reserve volume has been reached or passed, a user of the motor vehicle must be reminded to fill up the tank. Depending on area of application, different residual volumes are required. For example, in a car in which the tank is to be filled up only as part of normal service intervals, a substantially larger reserve volume must be provided than in a vehicle in which the user himself or herself is responsible for filling up the operating fluid.

SUMMARY OF THE INVENTION

It is accordingly an object of the invention to provide a device for storage or supply of an operating fluid for a motor vehicle, a method for mounting the device, a method for monitoring the device and a motor vehicle, which overcome the hereinafore-mentioned disadvantages and alleviate the highlighted technical problems of the heretofore-known devices, methods and vehicles of this general type. In particular, a highly advantageous device for storage of an operating fluid is described which includes suitable electrodes for determining a filling level which can easily be adapted to different tank geometries and reserve volumes.

With the foregoing and other objects in view there is provided, in accordance with the invention, a device for storage of an operating fluid. The device comprises a tank having an interior space, a protrusion protruding into the interior space and having a circumferential surface, and at least one electrode running radially at least partly around the circumferential surface and configured for determining a filling level.

The at least one electrode for determining the filling level is normally in electrical contact with the operating fluid present in the interior space. Consequently, at least one of the electrodes is disposed in a region, in such a way that it forms a corresponding contact (at least on a completely filled tank). Further electrodes can also be provided which are spaced from the first electrode.

The tank constitutes a (lockable) reservoir for a reducing agent into which the reducing agent can be introduced and from which it can be extracted again (at another point). It is also preferable for the tank to include several subdivisions formed by plastic tank walls. In this case, the tank usually has at least one cover, side walls and a bottom. These delimit (at least) one interior space available for the reducing agent. Protruding into this interior space is a protrusion with a circumferential surface, wherein the circumferential surface at least partly constitutes one tank wall. The protrusion is, for example, formed as a bulge, convex curvature, concave wall segment or the like. Such a protrusion can preferably also be provided as a corresponding recess on the outside of the tank. Preferably, the protrusion extends over at least a significant extent of the filling level, for example at least 5 cm (centimeters) or even 10 cm. In particular, the protrusion is formed on the bottom or on a side wall of the tank.

The electrode, which is formed radially and at least partially circumferentially, can be fixed at a predefinable position on the protrusion extending into the tank. This allows an adaptation of the position of the electrode to different tank geometries and/or filling levels to be detected of the reducing agent. For this purpose, the protrusion can have different diameters, contact surfaces, etc. to fix the electrode at predetermined points.

The device according to the invention is suitable, in particular, for storage and supply of liquid reducing agent or liquid reducing agent precursor solution. Such a reducing agent precursor solution is usually electrically conductive. A filling level can therefore be determined advantageously through an electrode configuration.

The term electrical contact in this case means, in particular, an electrically conductive contact in which an electrical current can flow from the electrode into the fluid or from the fluid into the electrode. Alternatively, an electrical contact can be present with a capacitance or inductance which changes depending on the presence of operating fluid. For a capacitive contact, for example, an electrical capacitance can be determined at the electrode.

Preferably, the electrode runs completely around the circumferential surface of the protrusion. The electrode is thus formed in the manner of an annular strip or band. It is, however, also possible for the electrode to only partially span the protrusion, and/or for several segments of the electrode to be disposed behind each other (offset) in the circumferential direction.

In accordance with another advantageous feature of the device of the invention, an insulating material is disposed between the circumferential surface and the at least one electrode. This insulating material isolates the electrode electrically from the protrusion. The protrusion can then, for example, also be made of metal so that its surface itself has an electrical conductivity. Preferably, the insulating material is formed over a height of the protrusion which is greater than the width of the at least one electrode. In this way the electrode can be displaced on the insulation or on the circumferential surface during assembly and isolated from the protrusion by the insulating material in different positions. The insulating material can be applied to the protrusion, for example in the form of a coating or a glued strip.

In accordance with a further advantageous feature of the device of the invention, the protrusion is formed in a bottom of the tank, the at least one electrode is mounted releasably on the circumferential surface at a height measured from the bottom of the tank and a reserve volume of the tank is defined by the height. The height extends in particular, starting from a theoretical plane of the tank bottom, in a direction vertical thereto up to the at least one electrode. For an unevenly shaped bottom, the theoretical plane of the bottom can, for example, correspond to a mean bottom plane.

Through the use of the at least one electrode it can therefore easily be established when a reserve filling level of the operating fluid in the tank is reached. On a horizontal orientation of the tank, this reserve volume is delimited by the tank bottom and a plane defined by the at least one electrode. Since the electrode is mounted releasably on the circumferential surface, the height of the electrode can be changed during assembly. This also changes the reserve volume. Thus, the reserve volume can be adapted to different motor vehicle types by changing the height of the electrode. At the same time, the reserve volume can be adapted to different tank geometries. Different tank geometries have different tank cross-sectional areas. A reserve volume is the product of the cross-sectional area and the height. Therefore, an adaptation of the height of the at least one electrode is required in order to achieve the same reserve volume for different tank geometries.

In accordance with an added feature of the device of the invention, the at least one electrode includes a clamping mechanism with which the electrode is clamped to the circumferential surface. It is very easily possible to fix the at least one electrode at a specific height in the tank by using a clamping mechanism, in particular by force-locking. Such a clamping mechanism can be releasable and/or can fix at least one electrode permanently after a single installation. The clamping mechanism clamps the electrode, in particular, around the circumferential surface of the protrusion. A force-locking connection is one which connects two elements together by force external to the elements, as opposed to a form-locking connection which is provided by the shapes of the elements themselves.

In accordance with an additional advantageous feature of the device of the invention, the at least one electrode is divided circumferentially into several contacting segments which are contacted separately from each other. A segmented electrode (formed from several contacting segments) is formed, for example, as a band running around the protrusion and including individual partial regions which are electrically isolated from each other, succeed each other in the circumferential direction and, for example, each span a specific arc dimension of, for example, between 180° and 30° [angular degrees] of the circumferential surface of the protrusion. Also, in particular additionally, it is possible for the several contacting segments to also be disposed offset relative to each other in the axial direction (i.e. perpendicular to the circumferential direction of the protrusion).

In a further embodiment, the individual contacting segments can also be constructed as points and preferably distributed evenly about the circumference of the electrode. For example, between 2 and 12, preferably between 3 and 8 individual point-like contacting segments can be distributed evenly about the circumference of the electrode. Point-like in this case means, in particular, that the contacting segments only have a very short length in the circumferential direction in comparison with the circumference of the protrusion, for example less than one-tenth (1/10) or even one twentieth (1/20).

Such contacting segments, which are contacted separately from each other, can be connected to an analysis circuit which carries out a more precise calculation of the actual filling level in the tank from the values measured at the electrode (or the contacting segments). For example, a main component analysis can be carried out in which the different values measured at the different contacting segments are compared with each other. It is also possible to process the measurement values determined at the individual contacting segments together in a neuronal network. It can also be provided that a mean value is formed from the measured values determined at the different contacting segments. Thus, for example, sloshing movements occurring in the reducing agent tank can be compensated effectively. A corrected signal can thus be generated which indicates the reaching of a reserve filling level more precisely than a signal measured directly at only one contacting segment or a pair of contacting segments or electrodes. The values measured at the contacting segments are advantageously evaluated in a controller, analysis circuit or analysis electronics adapted to this end.

In accordance with yet another advantageous feature of the device of the invention, the at least one electrode is contacted through at least one flexible line which extends away from the circumferential surface of the electrode.

In accordance with yet a further advantageous feature of the device of the invention, the at least one electrode is contacted through at least one line which leads electrically isolated inward into the protrusion.

The at least one electrode, as already stated, is preferably mounted on an insulating material on the circumferential surface of the protrusion. Due to this insulating material, electrical contacting of the electrodes is only possible with difficulty so that it is proposed herein to guide the contacting lines away toward the outside and lead them out of the interior space of the tank at a point outside the insulating material. This point can, for example, be disposed on the top of the protrusion. The at least one line is thus guided inward into the protrusion. It is also possible that the at least one line is guided out of the interior space of the tank inward into the protrusion at the circumferential surface. Advantageously, the lines themselves are isolated directly from the region of the electrode (electrically and chemically resistant). Since the lines are flexible, the electrodes can also be displaced on the circumferential surface where required.

With a suitable embodiment it can even be achieved that the line is guided out of the interior space of the tank in the region of the insulating material. This can be achieved by a suitable contact rail which creates a connection, electrically isolated from the interior space of the tank, between the electrode and the protrusion. For example, the electrode can extend in regions at a distance from the circumferential surface and the line can be guided through the circumferential surface in this region. The at least one line can then also extend toward the inside to the circumferential surface of the protrusion. It can thus be achieved that the at least one line does not extend as a line loop through the interior space of the tank. Such a line loop can, for example, be damaged by mobile frozen operating fluid present in the tank.

In accordance with yet an added advantageous feature of the device of the invention, a delivery unit is disposed in the protrusion to deliver the operating fluid out of the tank. In the protrusion then, outside the interior space, a cavity is formed which is particularly suitable for the configuration of a delivery unit for the operating fluid. A delivery unit can be provided in this case without additional space being required outside the device. In addition, the protrusion can be closed from the outside by a cover so that the delivery unit is protected from external influences. The delivery unit includes at least one delivery pump and where applicable at least one of the following components: delivery line for operating fluid extracted, valve, filter, sensor, etc. It is particularly preferred that all components for delivery of operating fluid are disposed externally in the protrusion of the tank so that from there only one delivery line and one metering unit or supply unit (e.g. injector) for the operating fluid are provided.

With the objects of the invention in view, there is also provided a method for mounting a device according to the invention. The method comprises:
 a) providing a tank with an interior space, a bottom and an opening in the bottom;
 b) providing a container having a circumferential surface;
 c) mounting at least one electrode running radially around the circumferential surface of the container; and
 d) inserting the container in the opening to form a protrusion into the interior space of the tank with the container.

In this method, the actual tank and the protrusion protruding into the tank are two separate components before assembly. Preferably, the container is made of a different material than the tank. The container can, for example, be metallic while the tank is preferably made of plastic. As long as the container is outside the tank, the radially circumferential electrode can very easily be mounted on the circumferential surface of the container. After insertion of the container in an opening of the tank, the container forms the protrusion into the interior space of the tank.

The container preferably forms an assembly with a reducing agent delivery unit disposed in the container. The installation in step c) can be permanent and not able to be released again without destruction of at least the electrodes.

In principle, it is preferred for the steps given above to be performed in the order given. It is, however, also possible to undertake a different sequence of steps. For example, steps c) and d) can be exchanged when assembly of the at least one electrode is to take place only in the tank.

With the objects of the invention in view, there is furthermore provided a method for monitoring a reserve filling level of an operating fluid in a device according to the invention having at least two electrodes disposed radially above one other. The method comprises:
 x) applying an electrical voltage between the two electrodes;
 y) testing an electrical resistance between the two electrodes; and
 z) evaluating the electrical resistance.

With this method according to the invention, it is possible to measure whether or not operating fluid is present at the height of the electrodes by measuring the electrical resistance between the electrodes. Such a method is useful if the operating fluid is electrically conductive, as is the case, for example, for aqueous urea solution. The device according to the invention can very easily be adapted to the method according to the invention for monitoring a reserve filling level in that e.g. the height of the electrodes measured from the bottom of the tank is adapted accordingly. The distance of the electrodes from each other can also be adapted. This allows adaptation of the device according to the invention to different operating fluids and different conductivities of the operating fluids.

The benefits outlined for the device according to the invention and the particular embodiments can be transferred in a similar manner to the two methods according to the invention. The same applies to the particular benefits and embodiments outlined for the two methods according to the invention which can be transferred both to the other method according to the invention and to the device according to the invention.

With the objects of the invention in view, there is concomitantly provided a motor vehicle, comprising an internal combustion engine, an exhaust system configured to clean exhaust gases from the internal combustion engine and including at least one injector configured to supply an operating fluid, a device according to the invention connected to the injector, and a control unit configured or programmed to control the device and the injector. The control unit can also be configured or programmed for performing the monitoring method according to the invention.

Other features which are considered as characteristic for the invention are set forth in the appended claims, noting that the features listed individually in the claims can be combined with each other in any arbitrary, technically useful manner and be supplemented by explanatory information from the description, in which further embodiment variants of the invention are disclosed.

Although the invention is illustrated and described herein as embodied in a device for storage of an operating fluid for a motor vehicle, a method for mounting the device, a method for monitoring the device and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
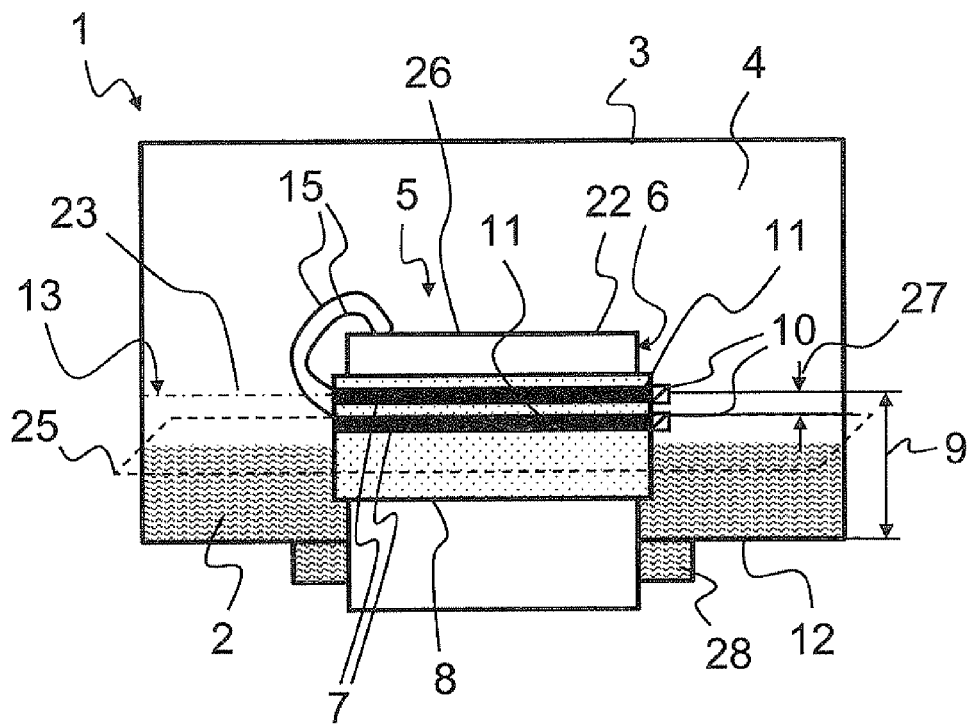
FIG. 1 is a diagrammatic, vertical-sectional view of a first embodiment variant of a device according to the invention.

Referring now to the figures of the drawings in detail and first, particularly, to FIGS. 1, 2 and 3 thereof, there are seen embodiment variants of the device according to the invention which have a multiplicity of correlating features and are therefore initially only explained jointly below. The same components are identified with the same reference numerals in the figures.

The device 1 according to the invention has a tank 3 with an interior space 4 which is filled partially with operating fluid 2 (in particular an aqueous urea solution). A protrusion 5 with a circumferential surface 6 protrudes into the interior space 4. An insulating material 8, on which two electrodes 7 are mounted at a predefined height 9, is provided on the circumferential surface 6.

Figure 2:
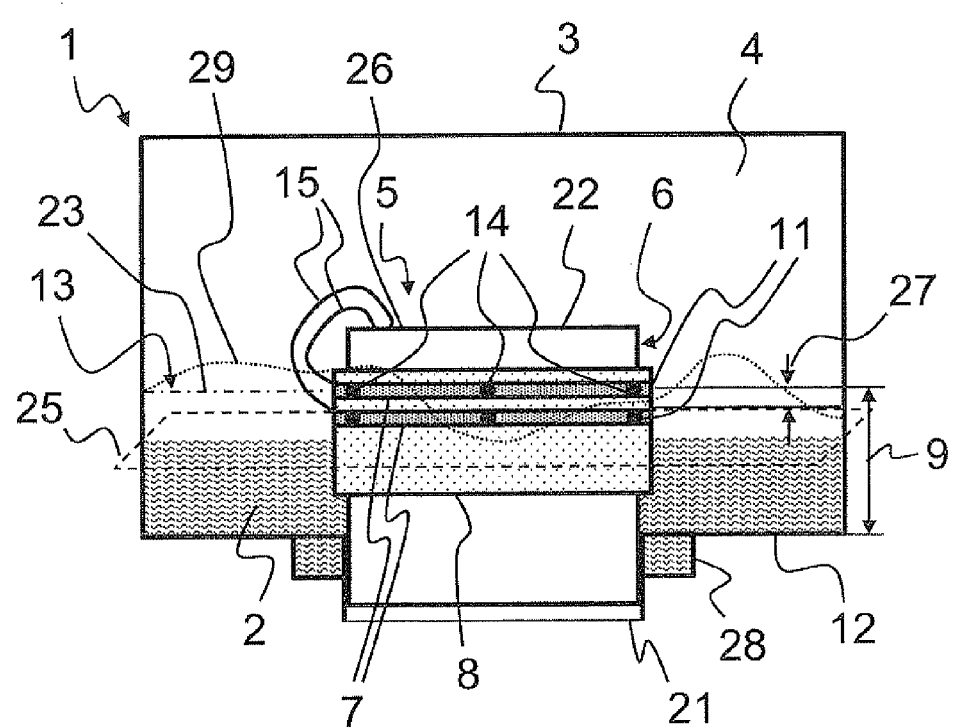
FIG. 2 is a vertical-sectional view of a second embodiment variant of the device according to the invention.

FIGS. 1 and 2 both show the height 9 which is decisive for determining a reserve filling level 23. The height 9 is namely the filling level which the operating fluid 2 must reach in the interior space 4 so that an electrical connection exists between the two electrodes 7. The height 9 is measured in each case in relation to a bottom 12 of the tank 3. The electrodes 7 are formed by conductor tracks 11 running around, disposed in tiers or stacked on the circumferential surface 6. The electrodes 7 are each contacted by lines 15 which extend initially radially away from the circumferential surface 6 starting from the electrodes 7, and then lead to a top 26 of the protrusion or projection 5.

A reserve volume 13 in the tank 3, which is monitored by the electrodes 7, is substantially defined by the height 9 in combination with a cross-sectional area 25 and extends from a height of the reserve filling level 23 to the bottom 12 of the tank 3.

In order to adapt the electrodes 7 to different tanks 3 for different reserve filling levels 23 and/or different electrical properties of the operating fluid, firstly the height 9 of the electrodes 7 and secondly a distance 27 of the electrodes from each other, can be varied.

A special feature of the embodiment variant of the device 1 shown in FIG. 1 is a clamping mechanism 10 with which the electrodes 7 can be clamped to the circumferential surface 6 of the protrusion 5.

A special feature of the embodiment variant of the device shown in FIG. 2 is segmented electrodes 7 which include individual contacting segments 14. A surface of the operating fluid 2 executing a sloshing movement is also shown as an example. Due to this fluid movement, some of the contacting segments 14 are reached by the operating fluid 2 while other contacting segments 14 are not reached. The measurement values of all of the contacting segments 14 can be processed together and jointly in order to obtain reliable information about an actual filling level 29.

FIG. 2 also shows that the protrusion 5 is formed by a (separate) container 22 which is inserted in an opening 21 in the bottom 12 of the tank 3. In the region of the opening 21 of the bottom 12 of the tank 3, the bottom 12 has a deeper region which forms a sump 28 running around the protrusion 5 in the bottom of the tank 3. The container 22 and the bottom 12 are fluid-tightly connected to each other in the region of the opening 21. The container 22, the electrodes 7 and the opening 21 are preferably constructed in such a way that the container 22 with the electrodes 7 can be inserted in the opening 21.

Figure 3:
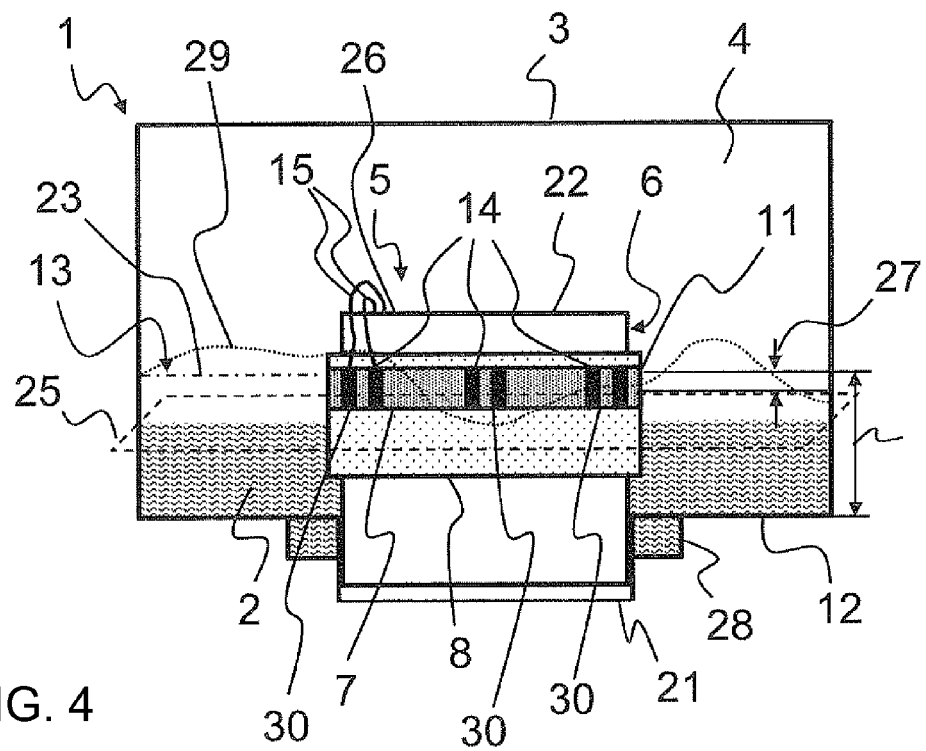
FIG. 3 is a vertical-sectional view of a third embodiment variant of the device according to the invention.

A particular feature of the embodiment variant of the device 1 according to the invention shown in FIG. 3 is that there is only one segmented electrode 7 on which several contacting segments 14 are disposed next to each other. The contacting segments 14 are each disposed as pairs 30. One such pair 30 of contacting segments 14 is contacted by separate lines 15. If an electrical contact is established between the two contacting segments 14 of a pair 30, then operating fluid 2 is present at this pair 30. Due to the structure according to FIG. 3, the benefits of the device 1 according to the invention can be achieved with only one electrode 7 being required for this purpose. If, as shown in FIG. 3, several pairs 30 are present and distributed over the circumference of the protrusion 5, an effective compensation for sloshing movements in the tank 3 can even be achieved with an analysis circuit. FIG. 3 also shows that the contacting segments 14 are linear and extend over part of the height of the protrusion 5. Thus, a certain tolerance in filling level determination in relation to sloshing movements can be achieved because the contacting segments 14 stand in electrical contact with the reducing agent 2 over a larger range of filling levels.

Figure 4:
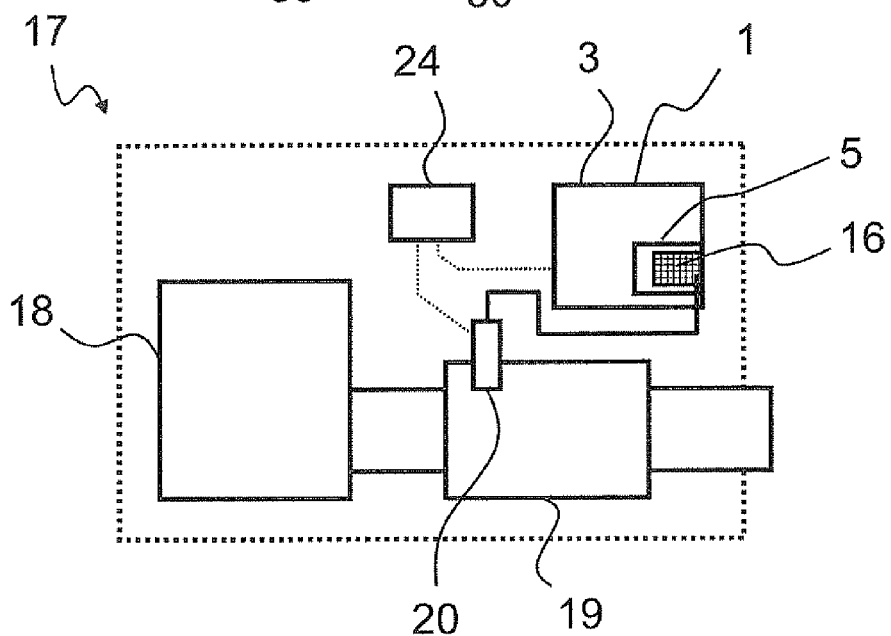
FIG. 4 is a vertical-sectional view of a motor vehicle including a device according to the invention.

FIG. 4 shows a motor vehicle 17 including an internal combustion engine 18 and an exhaust system 19 to clean or purify exhaust gases from the internal combustion engine 18. The exhaust system 19 has an injector 20 through which a reducing agent which is stored in a device 1 can be supplied to the exhaust system 19. It is also clear that the device 1 has a tank 3 into which a protrusion 5 protrudes. A delivery unit 16, which is disposed in the protrusion 5 according to FIG. 4, can deliver the operating fluid out of the tank 3 or the device 1 to the injector 20. A control unit 24 is configured or programmed to control the injector 20 and the delivery unit 16 or the device 1.

The device according to the invention allows a particularly economical and simple adaptation of an electrode configuration for determining the filling level in the tank for an operating fluid of a motor vehicle to various tank geometries and for various reserve filling levels in the tank.

The invention claimed is:

1. A device for storage of an operating fluid, the device comprising:
    a tank having an interior space;
    a protrusion protruding into said interior space and having a circumferential surface, said tank having a bottom in which said protrusion is disposed;
    at least one electrode running radially at least partly around said circumferential surface and configured for determining a filling level of the operating fluid in said tank;
    said at least one electrode being mounted releasably on said circumferential surface at a height measured from said bottom of said tank; and
    said height defining a reserve volume of said tank; and a delivery unit disposed in said protrusion, said delivery unit having a pump and being configured to deliver the operating fluid out of said tank.

2. The device according to claim 1, wherein said at least one electrode includes a clamp with which said at least one electrode is clamped to said circumferential surface.

3. The device according to claim 1, wherein said at least one electrode is divided circumferentially into several contacting segments being contacted separately from each other by the operating fluid.

4. A method for mounting a device according to claim 1, the method comprising the following steps:
   a) providing a tank with an interior space, a bottom and an opening in the bottom;
   b) providing a container having a circumferential surface;
   c) mounting at least one electrode running radially around the circumferential surface of the container; and
   d) inserting the container in the opening to form a protrusion into the interior space of the tank with the container.

5. A device for storage of an operating fluid, the device comprising:
   a tank having an interior space;
   a protrusion protruding into said interior space and having a circumferential surface;
   at least one electrode running radially at least partly around said circumferential surface and configured for determining a filling level of the operating fluid in said tank;
   an insulating material disposed between said circumferential surface and said at least one electrode; and
   a delivery unit disposed in said protrusion, said delivery unit having a pump and being configured to deliver the operating fluid out of said tank.

6. The device according to claim 1, wherein said protrusion extends at least 5 cm into said interior space.

7. The device according to claim 1, wherein said delivery unit has at least one of a delivery line for the operating fluid, a valve, a filter, or a sensor.

8. A motor vehicle, comprising:
   an internal combustion engine;
   an exhaust system configured to clean exhaust gases from said internal combustion engine, said exhaust system including at least one injector configured to supply an operating fluid;
   a device according to claim 1 connected to said injector; and
   a controller configured to control said device and said injector.

9. The device according to claim 5, wherein said tank has a bottom and a sidewall, said protrusion is formed in said bottom or said sidewall.

10. A device for storage of an operating fluid, the device comprising:
    a tank having an interior space;
    a protrusion protruding into said interior space and having a circumferential surface;
    at least one electrode running radially at least partly around said circumferential surface and configured for determining a filling level of the operating fluid in said tank;
    at least one flexible line extending away from said circumferential surface of said protrusion and contacting said at least one electrode; and
    a delivery unit disposed in said protrusion, said delivery unit having a pump and being configured to deliver the operating fluid out of said tank.

11. A device for storage of an operating fluid, the device comprising:
    a tank having an interior space;
    a protrusion protruding into said interior space and having a circumferential surface;
    at least one electrode running radially at least partly around said circumferential surface and configured for determining a filling level of the operating fluid in said tank;
    at least one line contacting said at least one electrode and leading electrically isolated inwardly into said protrusion; and
    a delivery unit disposed in said protrusion, said delivery unit having a pump and being configured to deliver the operating fluid out of said tank.

12. A method for monitoring a reserve filling level of an operating fluid in a device, the method comprising the following steps:
    providing a device for storage of an operating fluid, the device including:
       a tank having an interior space;
       a protrusion protruding into the interior space and having a circumferential surface;
       two electrodes running radially at least partly around the circumferential surface and configured for determining a filling level of the operating fluid in the tank;
       an insulating material disposed between the circumferential surface and the two electrodes; and
       a delivery unit disposed in the protrusion, the delivery unit having a pump and being configured to deliver the operating fluid out of the tank;
    x) applying an electrical voltage between the two electrodes;
    y) testing an electrical resistance between the two electrodes; and
    z) evaluating the electrical resistance.

* * * * *